P. MONTUPET.
WHEEL, PULLEY, AND THE LIKE.
APPLICATION FILED MAR. 6, 1908.

942,400.

Patented Dec. 7, 1909.

Witnesses

Inventor:-
Pierre Montupet
by H. B. Willson & Co.
Attorneys

UNITED STATES PATENT OFFICE.

PIERRE MONTUPET, OF PARIS, FRANCE, ASSIGNOR TO SOCIETE MONTUPET & CO., OF NOGENT LES VIERGES, OISE, FRANCE.

WHEEL, PULLEY, AND THE LIKE.

942,400.

Specification of Letters Patent.   Patented Dec. 7, 1909.

Application filed March 3, 1908.   Serial No. 419,544.

*To all whom it may concern:*

Be it known that I, PIERRE MONTUPET, a citizen of the Republic of France, and residing at 15 Boulevard Lannes, Paris, France, have invented certain new and useful Improvements in Wheels, Pulleys, and the Like, of which the following is a specification.

This invention has for its object to provide an improved construction of wheel for automobile vehicles, pulleys and the like which shall have greater strength and less weight than the ordinary wheels, and it consists in forming the various elements of a wheel of a hollow or solid skeleton or core of suitable shape of tough metal (such as steel) around which is cast an envelop composed of aluminium or a light alloy of aluminium.

The wheel may be cast in one piece complete on the skeleton constituted by the assemblage of the cores constituting the different elements of the wheel, or it may be formed by fitting together the said elements which have been constructed separately in the same manner.

Figure 1:
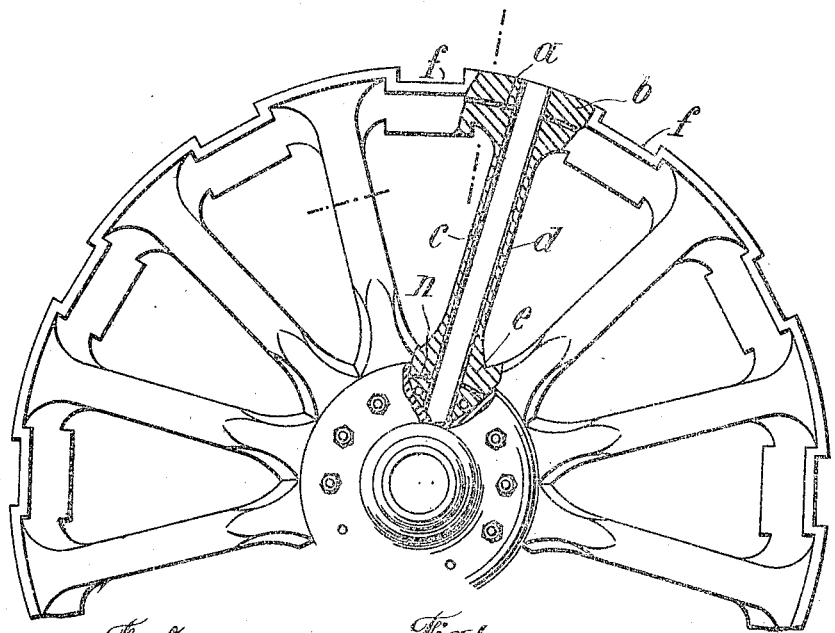
Figure 3:
Figure 2:
Figure 5:
Figure 6:
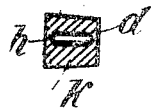
Figure 4:
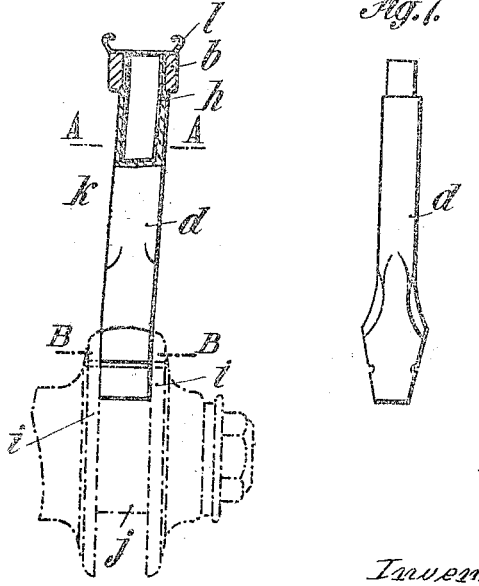
Figure 7:

In the accompanying drawings which are given solely by way of example, Figure 1 is a side view of a wheel constructed according to this invention cast in one piece; Fig. 2 is a cross section of one of the spokes; Fig. 3 is a cross section of the felly; Fig. 4 is an end view partly in section of a modification; Figs. 5 and 6 are horizontal sections on the lines A—A and B—B of Fig. 4; Fig. 7 is a side view of one of the spokes of the wheel shown in Fig. 4.

In the example shown in Fig. 1, the wheel is formed in one piece, the felly, the spokes and the hub being formed by a single casting. For this purpose a mold is employed in which the skeleton is inserted, constituted by the entire structure formed by assembling the core, $a$, of the felly, $b$, the tubular cores, $c$, of the spokes, $d$, and the core, $n$, of the hub, $e$. Then by pouring in a light alloy having aluminium as its basis, there is formed a wheel in one piece. The felly, $b$, may have any suitable cross section or peripheral shape; for example, it may be formed with peripheral recesses $f$, as shown.

If desired, a wheel composed solely of a felly and corresponding spokes may then be mounted in the usual manner on a suitable hub. Similarly, the wheel may be built of separate spokes, $d$, (Fig. 4) comprising each a tubular core, $h$, of tough metal, such as steel. This core may be formed of a tube treated in such a manner as to give it an oval shape in cross section (Fig. 5) in the part corresponding to the arms of the spoke, and a rectangular shape in cross section (Fig. 6) in the part which comes between the plates, $i$, of the hub, $j$, when the wheel is built. The tubular core thus formed is placed in a mold of suitable shape in which there is poured light metal, for example, an alloy of aluminium, so as to form an envelop, $k$, surrounding the case. This envelop forms with its steel or other metal core the arm of the spoke, while the lower enlarged portion is adapted to be mounted on the hub. The spokes thus formed may be straight or canted; they are mounted on the hub, $j$, and are fixed by means of bolts, the heads of which bear half against each adjacent spoke, while the nuts take their bearing on the plates, $i$, of the said hub. The spokes are tenoned in the same manner as the spokes of ordinary wheels into the felly, $b$, of aluminium which is composed of several pieces, and which is held together by a metal rim, $l$, for receiving the tire, or by means of a shrunk on hoop.

Solid cores which are completely embedded in the cast metal may be perforated for the purpose of lightening the wheel, of allowing the said metal to flow through the perforations and of insuring rigidity.

Having thus described my invention what I claim as new and desire to secure by Letters Patent is:—

1. A wheel composed of a skeleton of tough metal with an envelop of light alloy of aluminium around the skeleton, the latter comprising a series of tubular spoke cores and circular core bands for the felly and hub both perforated to allow the ends of the spoke members to pass therethrough.

2. A wheel composed of a skeleton of tough metal with an envelop of light alloy of aluminium around the skeleton, the latter comprising a series of tubular spoke cores, and circular core bands for the felly and hub both perforated to allow the ends of the spoke members to pass therethrough the core band for the felly being also perforated to allow the aluminium alloy to pass through for the purpose described.

In testimony whereof I have hereunto set my hand in presence of two subscribing witnesses.

PIERRE MONTUPET.

Witnesses:
 H. C. COXE,
 GEORGES BONNEUIL.